United States Patent [19]
Coulter et al.

[11] 3,812,335
[45] *May 21, 1974

[54] APPARATUS FOR OBTAINING STATISTICAL INDICES AND ANALYZING THE SAME AND METHOD

[75] Inventors: Wallace H. Coulter, Miami Springs; Walter R. Hogg, Miami Lakes, both of Fla.

[73] Assignee: Coulter Electronics, Inc., Hialeah, Fla.

[ * ] Notice: The portion of the term of this patent subsequent to Aug. 22, 1989, has been disclaimed.

[22] Filed: Aug. 23, 1971

[21] Appl. No.: 173,912

Related U.S. Application Data

[63] Continuation-in-part of Ser. No. 94,426, Dec. 2, 1970, Pat. No. 3,686,486.

[52] U.S. Cl. .............................. 235/151.3, 235/193
[51] Int. Cl. ...................... G06g 7/12, G01n 27/00
[58] Field of Search ................. 235/151.3, 185, 193; 324/71; 340/146.2

[56] References Cited
UNITED STATES PATENTS

| | | | |
|---|---|---|---|
| 3,623,015 | 11/1971 | Schmitz et al. | 340/146.2 |
| 3,654,445 | 4/1972 | Mikkelsen et al. | 235/151.3 |
| 3,603,875 | 9/1971 | Coulter et al. | 324/71 CP |
| 3,295,059 | 12/1966 | Coulter et al. | 324/71 CP |
| 3,557,352 | 1/1971 | Hogg et al. | 235/151.3 |
| 3,686,486 | 8/1972 | Coulter et al. | 235/151.3 |

Primary Examiner—Malcolm A. Morrison
Assistant Examiner—James F. Gottman
Attorney, Agent, or Firm—Silverman & Cass

[57] ABSTRACT

Apparatus which receives a train of electrical pulses from a particle analyzing device such as one which is operated in accordance with the Coulter principle, derives statistical indices from such train of pulses, stores the same in suitable storage means, receives a second train of pulses and derives the same indices from the second train of pulses, and compares the two indices. A readout device provides the comparison information. In this manner indices from one particulate system, such as for example a known sample, may be obtained and thereafter the same indices from an unknown sample may be obtained and compared with the indices from the known sample for study and analysis of the unknown particulate system.

6 Claims, 1 Drawing Figure

APPARATUS FOR OBTAINING STATISTICAL INDICES AND ANALYZING THE SAME AND METHOD

CROSS-REFERENCE TO RELATED APPLICATION

This application is a continuation-in-part of a co-pending application by the applicants herein, entitled, "Apparatus For Obtaining Statistical Hematological Indices And Analyzing The Same And Method," Ser. No. 94,426, filed Dec. 2, 1970 now U.S. Pat. No. 3,686,486.

BACKGROUND OF THE INVENTION

In the copending application above referred to, the background of the invention was related to certain problems arising in the study of indices of blood using the Coulter electronic counting and sizing apparatus (U.S. Pat. No. 2,656,508). As explained, even when accurate statistical curves are worked out, different conditions of use of the Coulter apparatus may give rise to variations which do not necessarily represent differences between normal blood and the blood being studied.

A second problem which is described relates to deriving certain statistical indices even when size distribution curves are worked out by means of the Coulter apparatus.

Both problems are solved by the apparatus of the copending application insofar as blood is concerned.

This application applies the teachings of the copending application to any particulate system, primarily those which are found in industry. Such particulate systems comprise industrial powders, slurries, metals, foods, fibers, plastics, carbon, inks, etc.

As in the case of the copending application, the indices of a known particle system are measured in the apparatus and stored, after which an unknown system is measured to derive its indices and a comparison is made.

Electrical means are provided for deriving the dispersion and the skewness indices of the particulate system.

Obviously in industrial particulate systems, two samples which are radically different in character will provide highly divergent indices. The invention is primarily intended for situations where the variation between samples is minimal, such as for example, in quality control. The known sample would comprise a standard or a particulate system whose characteristics are fully known and are acceptable. The unknown sample is one which is being assayed in order to learn whether it is acceptable, and hence to what extent it varies from the standard, if at all.

SUMMARY OF THE INVENTION

According to the invention, means are provided which accept the particle pulses from a prior source of the same, and electrically compute the indices C.Q.V. and S.K. Other indices may simultaneously be obtained, such as the mean particle volume (M.P.V.). All of the indices are stored in suitable storage devices such as for example the sliders of potentiometers manually adjusted index by index.

The first particulate sample which is processed by the apparatus is chosen to be a known sample. The derived indices are stored. Thereafter, the unknown sample is processed through the apparatus and the indices thereof obtained. The apparatus compares these second derived ones with the ones derived at first from a known sample. From these comparisons, the operator is able to ascertain whether there is a variation from the known and if so to what extent.

BRIEF DESCRIPTION OF THE DRAWING

The single FIGURE is a block diagram of apparatus constructed in accordance with the invention for obtaining three particulate system statistical indices and making comparisons between successive samples.

DESCRIPTION OF THE PREFERRED EMBODIMENT

Figure 1:
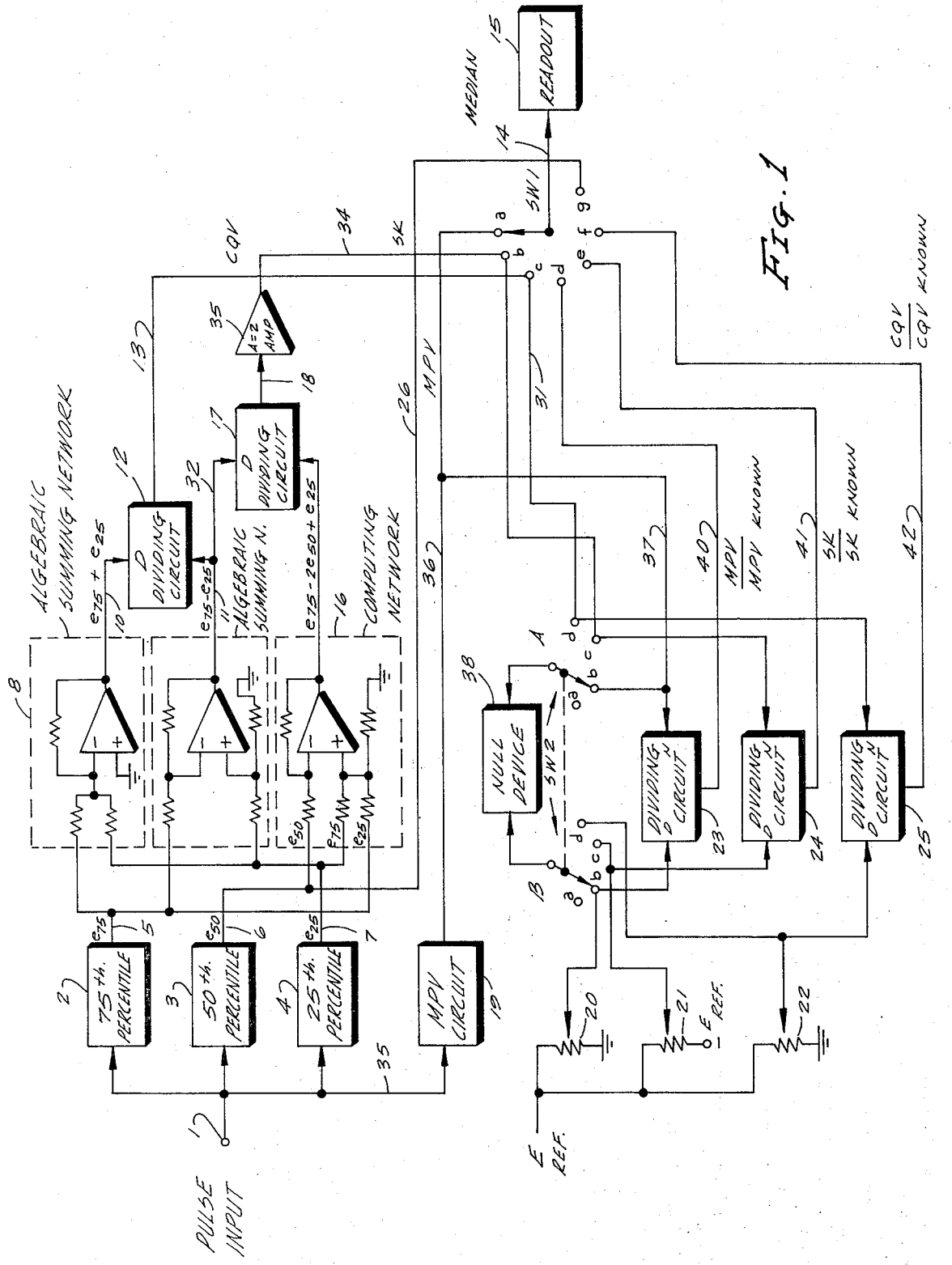

The block diagram illustrates one manner of carrying out the invention in which the indices which are obtained from a known particulate system are related to the size distribution of the particles, and these indices are compared with the equivalent indices from an unknown or test particulate system, a ratio being automatically obtained and made available to the operator for analysis. The three indices in this case comprise the coefficient of mass quartile variation (C.Q.V.), the coefficient of skewness (S.K.) and the mean particle volume (M.P.V.). The C.Q.V. is a measure of dispersion.

The first two of these indices are obtained by circuitry which is described in detail, and the third index is obtained by means of the M.P.V. circuit 19, which may be constructed in accordance with U.S. Pat. No. 3,473,010.

The input terminal 1 receives pulses from some form of particle analyzing device (not shown) which produces electrical pulses whose amplitudes are respectively proportional to the particles producing the same. For example, such a particle analyzing device could be the electronic apparatus which operates in accordance with the Coulter principle described in U.S. Pat. No. 2,656,508. Since the principal information relates to size distribution, the pulses from the Coulter apparatus may have had their quality improved through the use of some intervening apparatus which discards irregular pulses.

The incoming pulses are applied to three percentile discriminating circuits 2, 3 and 4. The circuit 2 which is designated 75th percentile has an output voltage $e_{75}$ on the line 5 which is proportional to the number of pulses in the 75th size quartile. In other words, three-quarters of all pulses received are smaller and one-quarter of all pulses received are larger. In the same manner, the 50th percentile and the 25th percentile voltages $e_{50}$ and $e_{25}$ are derived for the pulses received. The 50th percentile approximates the median, which in a normal distribution curve represents the peak of the bell-shaped curve. There will be more of these than any variations therefrom.

The voltages on the lines 5 and 7 are applied to the algebraic summing networks 8 and 9. The upper one 8 adds the voltages $e_{75}$ and $e_{25}$ and the lower one 9 subtracts these voltages. These two derived values appear on the lines 10 and 11 and are applied to the dividing circuit 12, the sum being applied to the denominator input and the difference being applied to the numerator input. The output from the dividing circuit is a d.c. voltage proportional to the index C.Q.V.

Reference may be had to *Elementary Statistics*, 2nd Edition, by John E. Freund, Prentice Hall, Englewood Cliffs, N.J. (1965) which gives this index the symbol $V_q$. The formula for the index is given as (on page 96 of the volume)

$$Q3 - Q1/Q3 + Q1 \cdot 100 + V_q \quad (1)$$

where $V_q$ is the coefficient of quartile variation (C.Q.V.) in percent,

Q3 is the 75th percentile in any suitable units;
Q1 is the 25th percentile in any suitable units.

It should be understood that quartile refers to the three dividing sizes at 25, 50 and 75 percent for a statistical system, in this case, particles.

The output of the dividing circuit 12 appearing on the path 13 is a voltage which also appears at the terminal c of the right-hand switch SW1 and also is applied by way of the line 31 to the terminal d of the right-hand section A of the switch SW2. When the arm of the switch SW1 is on the terminal c, the input 14 of the readout device 15 is connected to receive the voltage which represents the C.Q.V. index. This index will be read out for any sample which has been processed by the apparatus prior to the terminal 1.

The index S.K., as mentioned above, is the coefficient of skewness and it defines the symmetry or lack thereof for a particle size distribution, represented for example by the well-known bell-shaped curve. Reference may be had to *An Outline of Statistical Methods* 4th Edition, by Arkin & Colton, College Outline Series, Barnes & Noble, Inc. New York, N. Y. (1949). The formula for skewness coefficient is on page 41 of the volume and is defined as $$SK = (Q3 - \text{median}) - (\text{median} - Q1)/QD \quad (2)$$

When SK is the skewness coefficient,
Q3 is the 75th percentile
median is the 50th percentile
Q1 is the 25th percentile, and
QD is the distance between the 25th and 75th percentiles divided by 2 or $$Q3 - Q1/2$$

or $$SK = 2 Q_{75} - 2Q_{50} + Q_{25}/Q_{75} - Q_{25} \quad (3)$$

The operation of the numerator of formula (3) above may be performed by the use of an operational amplifier and resistors. These are shown in the block 16 designated computing network. The operation of this circuit is described in *Application Manual for Operational Amplifiers* published by Philbrick Nexus Research, A Teledyne Company, Dedham, Mass. 02026. The block 16 performs the required addition of 25th and 75th percentile and the subtraction of twice the 50th percentile.

The denominator of the formula (3) has already been accomplished by the algebraic summing network 9 and hence this value is derived by way of the line 32 and is applied to the denominator input of the dividing circuit 17. The numerator input is obtained directly from the computing network 16. The output at 18 is equal to all of the right-hand factor of formula (3) but not including the factor 2, and so this latter factor is applied by means of the amplifier 35 which has a gain of 2. This factor may be made more economically by a change of calibration of the readout 15.

The output of the amplifier 35 on the line 34 therefore comprises the coefficient of skewness based upon the position of the quartiles. It is applied both to the terminal b of the switch SW1 and the terminal c of the right-hand section A of the switch SW2. If the arm of the switch SW1 is rotated to contact the terminal b, a voltage equivalent to the coefficient of skewness S.K. may be read out on the readout device 15.

As noted previously, the particle pulses appearing at the terminal 1 are also applied by way of the line 35 to the MPV computer 19 and thence by way of the line 36 to the terminal a of the switch SW1. A branch of this line 37 leads to the terminal b of the right-hand section A of the switch SW2. When the arm of the switch SW1 is rotated to the terminal a, the MPV may be read out by the readout device 15. This is a d.c. voltage like the rest of the indices.

As thus far described, the apparatus will obtain the three indices which have been described, namely C.Q.V., S.K. and M.P.V. These values may be read out, regardless of the nature of the particulate sample which produced them. It is desired, as explained above, to store the values of the indices of known sample in the apparatus so that the operator may make a comparison between the known and some unknown sample or samples.

This can be accomplished by means of the storage devices which comprise in this case the potentiometers 20, 21 and 22. Each of the potentiometers is connected at its upper end to a positive reference voltage source $+E_{ref}$. The potentiometers 20 and 22 have their lower ends connected to ground because the indices which each of these will store will always be positive. The potentiometer 21 has its lower end connected to a negative reference voltage source $-E_{ref}$, since this potentiometer will be storing the coefficient of skewness which could be a negative value or zero.

These potentiometers 20, 21 and 22 have their slider arms connected respectively to the terminals b, c and d of the left-hand section B of the switch SW2. The movable arms of the switch SW2 are ganged and have a null device 38 connected across the same. The null device can be any suitable balancing meter or circuit which enables one to ascertain when the voltage inputs to its two terminals balance. Thus, by movement of the sliders of the potentiometers, one may set these sliders to store voltages in the potentiometers which represent the several indices. Terminals b of the switch SW2 cooperate with the potentiometer 20 to store a voltage representative of the M.P.V.; terminals c of the switch SW2 cooperate with the potentiometer 21 to store a voltage representative of the S.K.; and terminals d of the switch SW2 cooperate with the potentiometer 22 to store a voltage representative of the index C.Q.V. In each case the operator rotates the arms of the switch SW2 to the particular position and adjusts the slider of the involved potentiometer until there is a balance or a null.

The above procedure is followed using a known sample of particles, storing the indices in the potentiometers. After this has been done, the unknown sample is used to derive the particle pulses which are applied to the terminal 1. New values of the three indices are obtained. These new values appear at the terminals $a$, $b$, and $c$ of the switch SW1. The arms of the switch SW2 in the meantime could have been moved to a zero position to the terminals $a$. It will be noted that there are three dividing circuits 23, 24 and 25 connected across each pair of terminals $b$, $c$, and $d$, respectively of the switch SW2. The stored values of the indices are connected to the denominator inputs of the respective dividing circuits 23, 24 and 25, while the new values of the indices are connected to the respective numerator inputs. The dividing circuits therefore perform the operation of division, and their outputs 40, 41 and 42 give the ratios of the two indices in each case. The circuit 23 has its output line 40 connected to the terminal $d$ of the switch SW1 and hence the ratio of $MPV/MPV_{known}$ is available at the terminal $d$ and may be read out when the arm of the switch SW1 is rotated to this terminal. Likewise, the line 41 is connected to the terminal $e$ of the switch SW1 and the line 42 is connected to the terminal $f$ of the switch SW1. When the arm is at these terminals, the ratios of the unknown to the known indices of the S.K. and the C.Q.V. respectively may be read out in the readout device 15.

The operator may turn the arm of the switch SW1 to terminal $b$ and ascertain whether the index S.K. is positive (skewed to the right) or negative (skewed to the left). When the value of $MPV/MPV_{known}$ is greater or less than unity, the particle sizes of the unknown sample depart from the known system. If $CQV/CQV_{known}$ is greater than unit it will mean that the distribution of the particles in the unknown sample is broader than the known system, and if less than unity it will mean that the distribution is narrower than that of the known system. It is seen that the median particle size can be readily ascertained by means of the lead 26 extending from the output to the switch terminal $g$ of the switch SW1 from whence it can be read out when desired.

The measure of median particle size with respect to the M.P.V. is another measure of skewness. If there is no skewness, as occurs in mono-sized particulate systems, there is no difference between the median and the mean. If the median is greater than the mean, the distribution is skewed to the left, whereas if the median is smaller than the mean, then the distribution is skewed to the right.

Often the operator wishes to know the mode or most frequent size of particle. A simple calculation can provide this using the formula Mode = (approx.) 3 × Median − 2 × mean.

(4)

Reference may be had to page 102 of Freund, Op. cit.

Considerable variation can be made in the apparatus and its details without departing from the spirit or scope of the invention as defined in the appended claims. For example, the analog components may be replaced by digital components giving the same satisfactory results. The potentiometers 20, 21 and 22 could be automatically set by digital apparatus, thus obviating the need for manual adjustment. The operator could provide a known particulate sample to the prior apparatus, operate some suitable energizing means and have a programming device carry out the adjustments needed to store the known indices in the potentiometers 20, 21 and 22 or their equivalents.

What is desired to secure by Letters Patent of the United States is:

1. A method of analyzing an unknown sample of particles producing electrical pulses having amplitudes proportional to the sizes of said particles, said method comprising, the measuring of a statistical index of electrical pulses of a known sample of particles, storing an electrical quantity representative of this index, measuring the same index for the unknown sample and obtaining an electrical quantity representative of the latter index and comparing the two indices by division.

2. The method as claimed in claim 1 in which a plurality of indices are measured for each sample and compared by division.

3. The method as claimed in claim 1 in which the index is S.K.

4. The method as claimed in claim 1 in which the index is C.Q.V.

5. The method as claimed in claim 1 in which the index is M.P.V.

6. The method as claimed in claim 2 in which the indices include at least two of C.Q.V., S.K. and M.P.V.

* * * * *

UNITED STATES PATENT OFFICE
CERTIFICATE OF CORRECTION

Patent No. 3,812,335   Dated May 21, 1974

Inventor(s) WALLACE H. COULTER and WALTER R. HOGG

It is certified that error appears in the above-identified patent and that said Letters Patent are hereby corrected as shown below:

Column 3, line 6, change "Q3-Q1/Q3+Q1·100+$V_9$" to $-- \frac{Q3-Q1}{Q3+Q1} \cdot 100 = V_q --$ Column 3, line 36, change "SK=(Q3-median)-(median-Q1)/QD" to $-- SK = \frac{(Q3-median)-(median-Q1)}{QD} --$; Column 3, line 46, change "Q3-Q1/2" to $-- \frac{Q3-Q1}{2} --$; Column 3, line 50, change "SK=2$Q_{75}$-2$Q_{50}$+$Q_{25}$/$Q_{75}$-$Q_{25}$" to $-- SK = 2 \frac{Q_{75} - 2Q_{50} + Q_{25}}{Q_{75} - Q_{25}} --$; and Signed and sealed this 29th day of April 1975.

(SEAL)
Attest:

RUTH C. MASON
Attesting Officer

C. MARSHALL DANN
Commissioner of Patents
and Trademarks